(12) United States Patent
Albonetti (10) Patent No.: US 9,850,076 B2
(45) Date of Patent: Dec. 26, 2017

(54) SYSTEM FOR CONVEYING OBJECTS

(71) Applicant: Sacmi Cooperativa Meccanici Imola Societa' Cooperativa, Imola (IT)

(72) Inventor: Danilo Albonetti, Imola (IT)

(73) Assignee: SACMI Cooperativa Meccanici Imola Societa' Cooperativa (IT)

( * ) Notice: Subject to any disclaimer, the term of this patent is extended or adjusted under 35 U.S.C. 154(b) by 0 days.

(21) Appl. No.: 14/896,554

(22) PCT Filed: Apr. 10, 2014

(86) PCT No.: PCT/IB2014/060606
§ 371 (c)(1),
(2) Date: Dec. 7, 2015

(87) PCT Pub. No.: WO2014/207582
PCT Pub. Date: Dec. 31, 2014

(65) Prior Publication Data
US 2016/0130094 A1   May 12, 2016

(30) Foreign Application Priority Data

Jun. 24, 2013   (IT) .............................. MO2013A0182

(51) Int. Cl.
*B65G 47/84* (2006.01)
*B65G 43/08* (2006.01)
*B65G 47/31* (2006.01)

(52) U.S. Cl.
CPC ........... *B65G 47/848* (2013.01); *B65G 47/31* (2013.01); *B65G 47/846* (2013.01); *B65G 43/08* (2013.01); *B65G 2203/042* (2013.01)

(58) Field of Classification Search
CPC .... B65G 47/846; B65G 47/848; B65G 47/31; B65G 2203/042; B65G 43/08; B65G 47/847; B65G 29/00
See application file for complete search history.

(56) References Cited

U.S. PATENT DOCUMENTS

| 2,547,729 | A | * | 4/1951 | Aiken | B65G 47/846 |
| | | | | | 156/DIG. 25 |
| 3,047,032 | A | | 7/1962 | Carter | |
| 4,239,116 | A | * | 12/1980 | Eisenberg | B65G 47/846 |
| | | | | | 198/351 |
| 4,428,474 | A | * | 1/1984 | Gau | B65C 9/067 |
| | | | | | 198/376 |
| 4,722,432 | A | | 2/1988 | Staton | |

(Continued)

FOREIGN PATENT DOCUMENTS

CH         EP 1559663 A1 *  8/2005  ........... B65G 15/105

*Primary Examiner* — Mark A Deuble
(74) *Attorney, Agent, or Firm* — Laubscher, Spendlove & Laubscher, P.C.

(57) ABSTRACT

A conveyor system to convey objects is described, in which a conveyor belt moves while having a controlled speed to advance the objects, arranged in a row one after the other at a distance one from the other, toward a first rotating disc that rotates at a controlled speed in an independent manner from the speed of the conveyor belt and that has, on a perimeter thereof, a plurality of first cavities arranged mutually spaced apart angularly to receive the objects from the conveyor belt, a second rotating disc being arranged to receive the objects from the first rotating disc.

23 Claims, 10 Drawing Sheets

(56) References Cited

U.S. PATENT DOCUMENTS

| | | | | |
|---|---|---|---|---|
| 4,793,461 A | * | 12/1988 | Leonard | B65B 57/00 198/341.02 |
| 5,092,450 A | * | 3/1992 | Schommartz | B65G 43/08 198/460.1 |
| 5,531,312 A | | 7/1996 | Dickey | |
| 6,520,318 B1 | * | 2/2003 | Humele | B65G 47/847 198/470.1 |
| 6,732,498 B2 | * | 5/2004 | Keen | B65B 65/08 198/471.1 |
| 2007/0227858 A1 | * | 10/2007 | Aoyama | A61F 13/15764 198/612 |
| 2009/0269172 A1 | * | 10/2009 | Egerton | B65G 29/00 414/223.01 |
| 2011/0108389 A1 | * | 5/2011 | Bonnain | B65G 47/244 198/384 |
| 2014/0238821 A1 | * | 8/2014 | Woinski | B65G 17/46 198/464.2 |

\* cited by examiner

SYSTEM FOR CONVEYING OBJECTS

This application is a §371 national stage entry of PCT International Application No. PCT/IB2014/060606 filed Apr. 10, 2014. PCT/IB2014/060606 claims priority to IT Application No. MO2013A000182 filed Jun. 24, 2013. The entire content of these applications are incorporated herein by reference.

BACKGROUND OF THE INVENTION

The invention relates to a conveyor system, in particular to convey objects arranged in a row one after the other at a distance one from the other through one or more apparatuses for machining the same objects.

Specifically, but not exclusively, the invention may be applied to convey closures for containers (such as, for example, capsules for bottles, lids for vases, or objects of another type with similar shapes) in the ambit of a manufacturing line for the closures and/or the gaskets within the same closures. In particular, the objects (for example closures for containers) can be made of a plastic or metal material. Furthermore, the invention could be applied for the transport of containers, such as, for example, plastic bottles, in particular in the ambit of a forming and/or filling or packaging line of the containers.

SUMMARY OF THE INVENTION

An object of the invention is to produce a conveyor system to convey objects arranged in a row one after the other at a distance one from the other.

An advantage is to adapt the feeding of objects arranged in a row on a belt to the rotation of a transport disc.

An advantage is to provide a system suitable to convey in line closures for containers from a forming apparatus of the closures to one or more processing apparatuses (cutting and/or folding and/or edging and/or gasket moulding).

An advantage is to reduce the scratching of the transported objects against parts of the conveyor system.

An advantage is to reduce the risk of damaging the transported objects.

An advantage is to transport, in a continuous, regular, and homogeneous manner, objects arranged one after the other at a distance one from the other.

An advantage is to provide a constructively simple and inexpensive conveyor system.

An advantage is to facilitate the connection in line of two or more apparatuses for processing objects.

These and other objects and advantages are achieved by the conveyor system according to one or more of the claims set forth herein below.

In an example, the conveyor system comprises a conveyor belt that moves while having a controlled speed to advance the objects, arranged in a row at a distance one from the other, toward a rotating disc that has, on a peripheral edge thereof, a plurality of cavities arranged mutually spaced apart angularly to receive the objects and that rotates at a controlled speed in an independent manner from the conveyor belt.

BRIEF DESCRIPTION OF THE DRAWINGS

The invention can be better understood and implemented with reference to the appended drawings, which illustrate some non-limiting implementation examples thereof.

DETAILED DESCRIPTION

In this description, similar elements that are in common to the various illustrated examples have been indicated with the same numerals. A conveyor system to convey objects 2, in particular through one or more processing apparatuses of the objects, has been generally indicated with 1. The objects 2 may comprise, by way of example, closures for containers (such as, for example, plastic or metal capsules for bottles, or plastic or metal lids for vases).

The conveyor system 1 comprises a closed-loop flexible transport member. This flexible transport member may comprise, in particular, a slidable conveyor belt 3 having a controlled speed to convey the objects 2 to a first area 4. The flexible transport member (belt 3) will be suitable, in particular, to advance the objects 2 arranged in a row at a minimum (preset) distance one from the other. In particular, such distance may be (approximately) constant throughout the row of objects arranged on the belt 3. However, such (non-null) distance may be not constant and/or not regular, by default or due to an error.

The conveyor belt 3 may be, for example, air-permeable (in particular, through holes drilled on the same belt). The conveyor belt 3 may be provided with a pneumatic suction device (of a known type, and not illustrated) to hold the objects 2 mutually spaced apart (at the same mutual distance) on the belt 3.

The conveyor system 1 may comprise, for example, a first rotating disc 5 (about a first rotational axis, for example, a vertical axis), which rotates while having a controlled speed to pick up the objects 2 from the conveyor belt 3 at the first area 4.

The first transport disc 5 may be arranged to convey the objects 2 from the first area 4 to a second area 6, in which the objects will be released by the first transport disc 5 and from which they will be able to continue their path. In particular, the objects 2 may be picked up by a second rotating disc 7 for transporting the objects.

The conveyor system 1 is provided with a motor configured to actuate the conveyor belt 3 and the first rotating transport disc 5 with speeds that are independent from one another. Such a motor includes, for example, a first motor to directly or indirectly drive the conveyor belt 3, and a second motor to drive directly or indirectly the first rotating transport disc 5. An electronic and programmable control unit 100 may be arranged to control the two motors according to a preset program. In particular, the control unit may control the speeds of the belt 3 and of the first disc 5 in a mutually independent manner. In particular, the control unit may include a device for changing the speed of the first transport disc 5 in response to a signal, such as a position signal and/or an object passage signal, provided by a sensor operating on the objects transported by the belt 3. In this case, the belt 3 speed may be constant, while the first transport disc 5 may change to adapt to the position of the objects detected by the sensor. Alternatively, the control unit may include a device for changing the speed of the conveyor belt 3 in response to a position and/or object passage signal provided by a sensor operating on the objects transported by the belt 3.

The first rotating transport disc 5 is provided, in particular (in this example, as well as in other examples described herein), with a plurality of first cavities arranged mutually spaced apart angularly to receive the objects 2.

The path for the objects may be provided with a first guide arranged to oppose a centrifugal force applied on the objects in at least one curvilinear part of the path (in particular, in the shape of an arc of a circumference) travelled by the objects transported by the first rotating disc 5.

The first guide may include a suction device arranged to operate on each first cavity to hold the object in place by a depression. In particular, the suction device includes an actuator 102 such as a vacuum pump to generate a depression, a suction manifold opening 8 (for example, in the shape of an arc of a circumference) and a plurality of suction ducts 9. The fixed actuator may be arranged externally to the first disc 5. The suction manifold opening 8 may be arranged externally to the first disc 5. For example, it may be arranged on a fixed horizontal wall below the first rotating disc 5. The suction manifold opening 8 communicates with the suction actuating device. The various suction ducts 9, which may be arranged inside the first disc 5, are connected to the suction manifold opening 8.

Each suction duct 9 may have a first end opening in a corresponding first cavity, and a second end opening on a surface of the first disc 5 facing the suction manifold opening 8.

Each first cavity may be shaped so as to have a first end portion 10 (at which a suction duct 9 begins) with a first inclination, shaped to invite the object to enter the first cavity, and a second end portion 11 with a second inclination, shaped to (stably) house the object in the first cavity during the transport.

The first inclination (of the first end portion 10) may have, in particular, a ratio between the tangential component and the radial component that will be greater than the second inclination (of the second end portion 11), where tangential and radial are meant with reference to a circumference about the first rotational axis of the first disc 5. The first end portion 10 may be arranged radially more outward than the second end portion 11. The first end portion 10 may be arranged circumferentially more forward, with reference to the rotation direction of the first disc, than the second end portion 11.

In particular, the first end of each suction duct may open in the second end portion 11 of the corresponding first cavity.

The first end portion 10 may have, for example, a convex outer (arc-shaped) surface, while the second end portion 11 may have, for example, a concave outer (arc-shaped) surface. In particular, the first end portion 10 may have an outer surface in the shape of an arc of a circumference. In particular, the second end portion 11 may have an outer surface in the shape of an arc of a circumference, for example with a curvature radius that is less than a curvature radius of the arc-shaped outer surface of the first end portion 10.

The second ends of the various suction ducts 9 may be arranged so as to follow a preset path (the same path in common to all the ducts 9) during the rotation of the first disc 5.

The suction manifold opening 8 may be arranged facing a portion of the above-mentioned path so that, while the first disc 5 rotates, each suction duct 9 alternates cyclically between an object holding active period during which the duct 9 is connected to the suction actuating device when the second end of the duct 9 faces the suction manifold opening 8 communicating therewith), and an inactive period during which the duct 9 is not actively connected to the actuating device when the second end of the duct 9 does not face the suction manifold opening 8.

The first rotating disc 5 (transport star) may have, as in the example, a vertical (or inclined, or non-horizontal) rotational axis. Each first cavity is arranged on a perimeter of the first disc 5 and is recessed in the radial direction.

The conveyor system 1 may include, a sensor to emit a signal relative to the position and/or the passage of an object on the conveyor belt 3. The conveyor system 1 may also include a control unit to control the speed of the conveyor belt 3 and/or of the first rotating disc 5 in response to the signal relative to the position and/or the passage of an object on the belt 3. In particular, the control unit may include a device for changing the speed of the first rotating disc 5 as a function of the speed (which is, for example a constant speed) of the belt 3 and the detected position of an object transported on the belt 3. In particular, the control unit may include a device for changing not only the speed of the first disc 5, but also, correspondingly, the speed of the rotary or linear transport device immediately downstream of the first disc 5, in order to maintain the coordination during the transport of the objects between the first disc 5 and the transport device immediately downstream of the first disc 5. In particular, the control unit may include a device for changing not only the speed of the transport device immediately downstream of the first disc 5, but also the speed of all of the transport devices arranged in a continuous line downstream of the first disc 5 in order to maintain the coordination between the first disc 5 and the whole transport line downstream of the first disc 5.

Such a sensor may include at least one sensor 12 of the objects arranged along the path of the objects on the belt 3 to detect the passage of the objects so as to determine a reference position for each object. Suitable sensors are a photocell or other position sensor. The signal provided by the sensor 12 may be sent to the control unit that, in response to the same signal, provides for aligning the advancement the objects 2 on the belt 3 with the transport of the same objects on the first disc 5 arranged downstream of the belt 3. Particularly, it is possible to determine a relationship between the distance between two consecutive objects on the belt 3 and the distance that the objects will have on the first rotating disc 5, thus determining a corresponding relationship between the speeds of the belt 3 and of the first disc 5 downstream of the belt 3, so as to ensure the coordination of belt 3 and disc 5 and the regular and continuous conveying of the objects 2. The sensor 12 for detecting the passage of the objects conveyed by the belt allows the timing of the belt 3 and of the first disc 5.

The second disc 7, which rotates having a controlled speed about a second rotational (vertical) axis, may pick up the objects 2 from the second area 6 and transport them to a third area. The second disc 7 may have, on the perimeter thereof, a plurality of second cavities (having, for example, first and second end portions 10 and 11) mutually spaced apart angularly and recessed in the radial direction to receive the objects 2.

The total number of second cavities of the second disc 7 may be different, for example greater, than the total number of first cavities of the first disc 5.

The first guide may include (in addition to or in place of the suction guide) a static guide of the barrier type including for example at least one fixed side guide 13 arranged for the lateral containment of the objects transported by the first rotating disc 5. It is possible to provide a second guide arranged to oppose a centrifugal force applied on the objects in at least one part of the path travelled by the objects 2 transported by the second rotating disc 7. The second guide may include a suction guide and/or a static guide, of the barrier type, including, for example, at least one fixed side guide 13 arranged for the lateral containment of the objects transported by the second rotating disc 7.

The belt 3 may be arranged, in particular, downstream of a forming apparatus (not shown) to receive in line the objects 2 (for example, closures for containers) newly formed in the forming apparatus and to transfer them to one or more processing machines where the objects are processed (for example, to form by cutting a facilitated opening line and/or to fold a safety band of the closure and/or for still other types of machining).

The second rotating disc 7 may belong, in particular, to a carousel 14 for machining closures for containers, for example, a carousel suitable to cut a weakening area on the closures and/or to fold a safety band of the closures and/or to border the closures, in particular aluminum closures, and/or to mould gaskets within the closures. In the specific case, the second disc 7 belongs to a cutting carousel 14 along which a weakening line is formed on the objects 2.

The second disc 7 may be arranged adjacent to a third disc 15 receiving the objects 2 in the third area and transfers them downstream.

Figure 1:
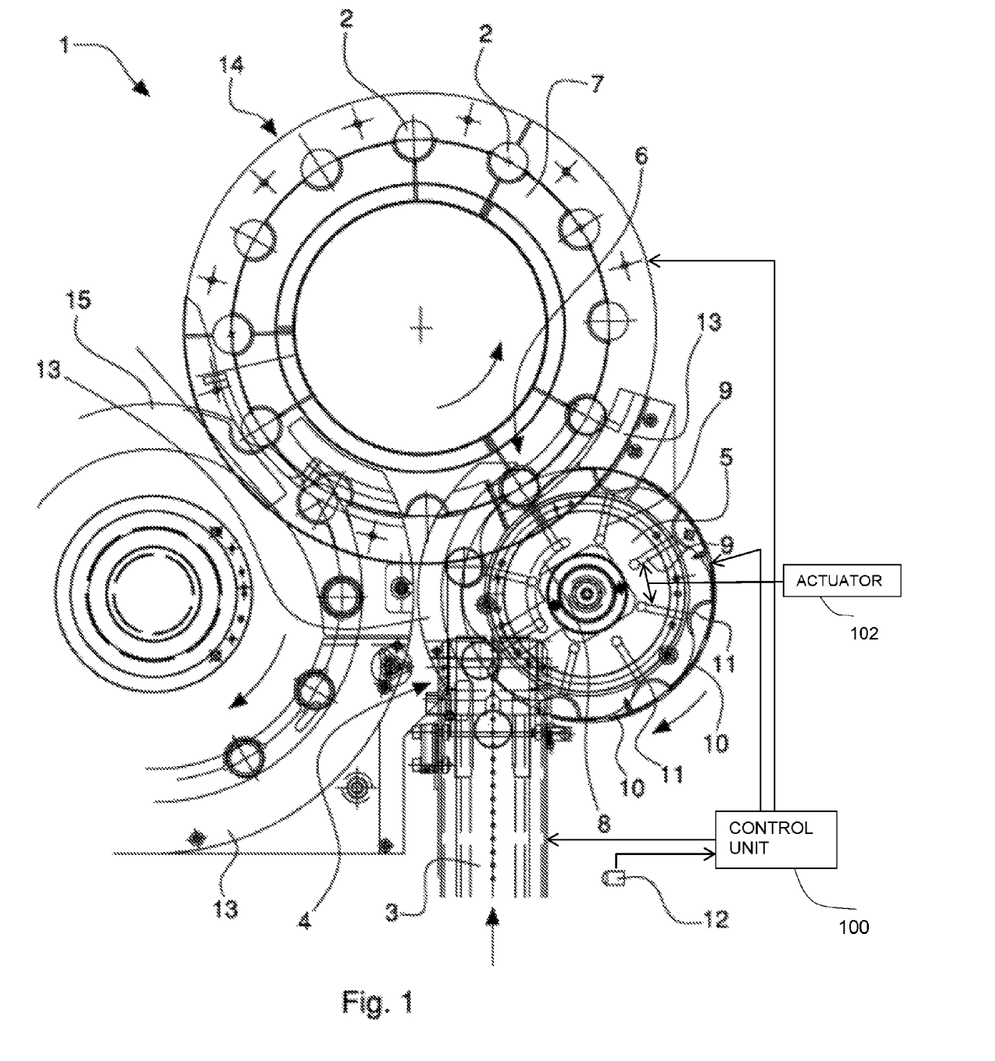
FIG. 1 is a top plane view of a first implementation example of the conveyor system as per object.
Figure 2:
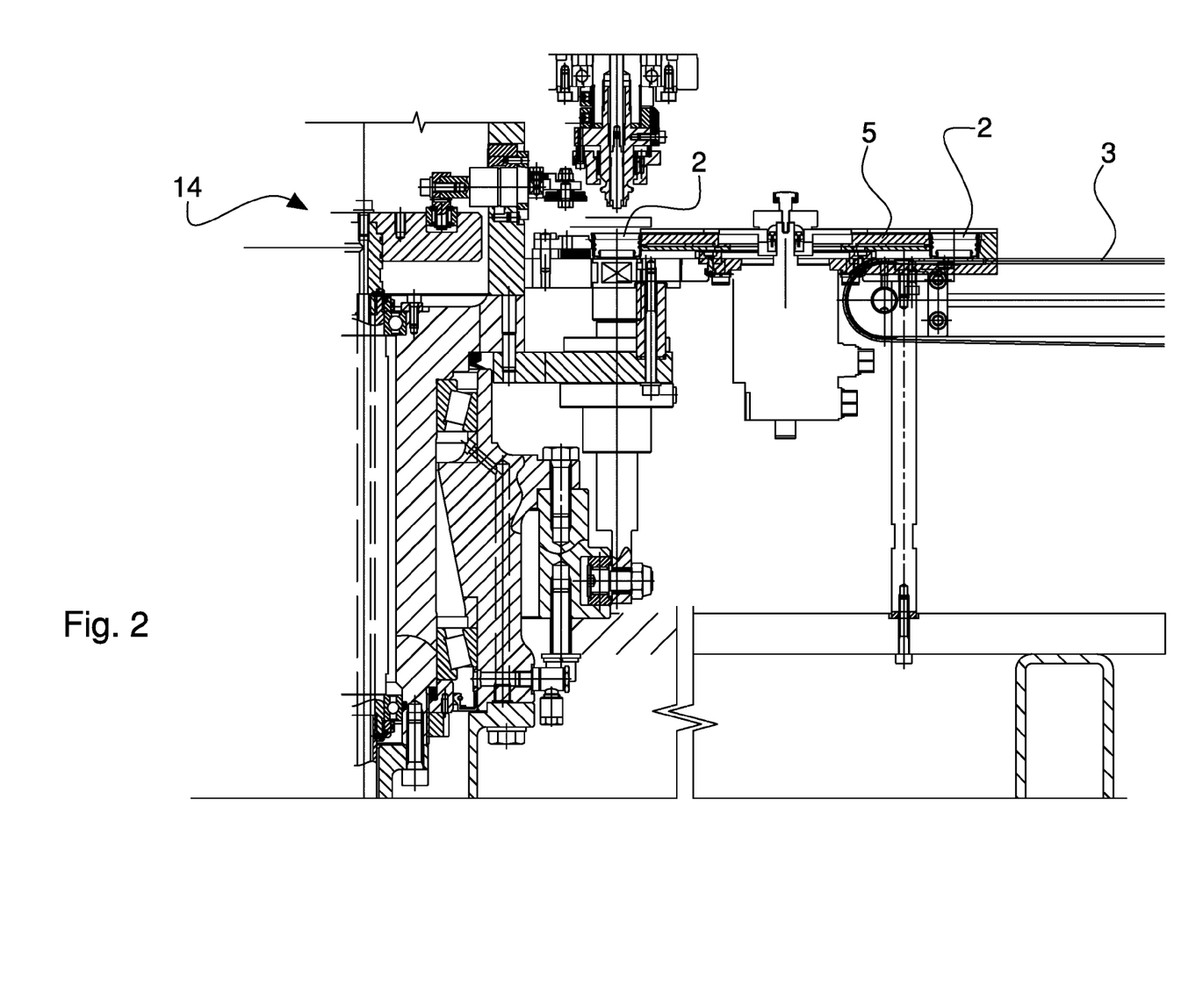
FIG. 2 is a section according to a vertical plane of the system of FIG. 1.
Figure 3:
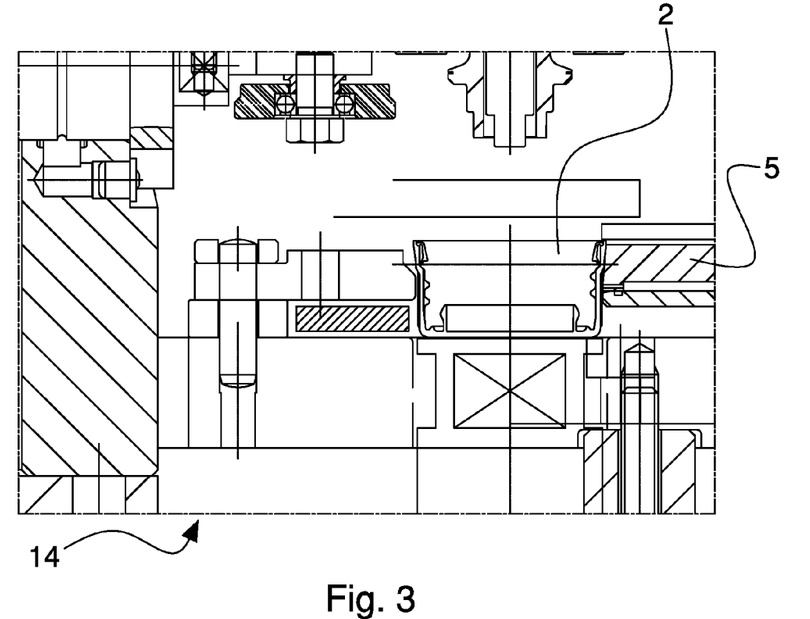
FIG. 3 is an enlargement of a detail of FIG. 2.
Figure 4:
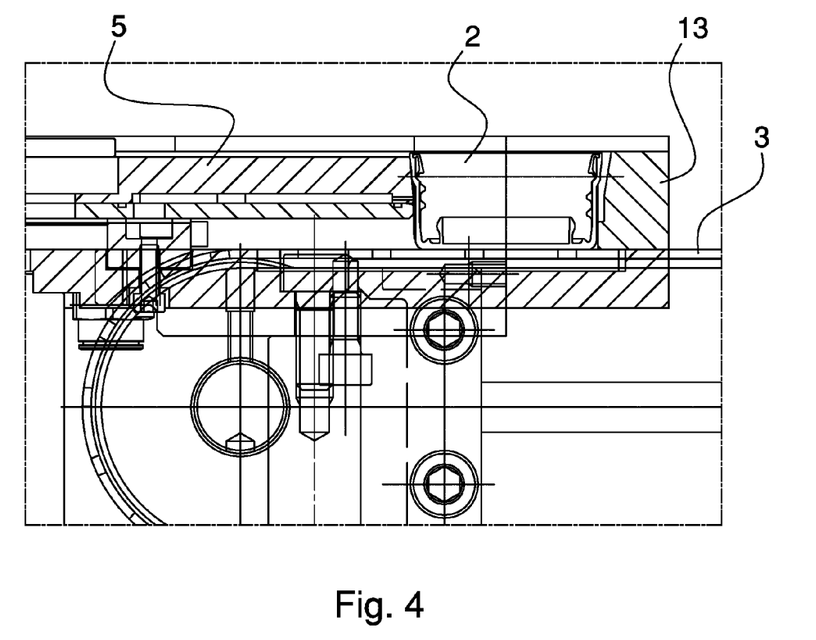
FIG. 4 is an enlargement of another detail of FIG. 2.
Figure 5:
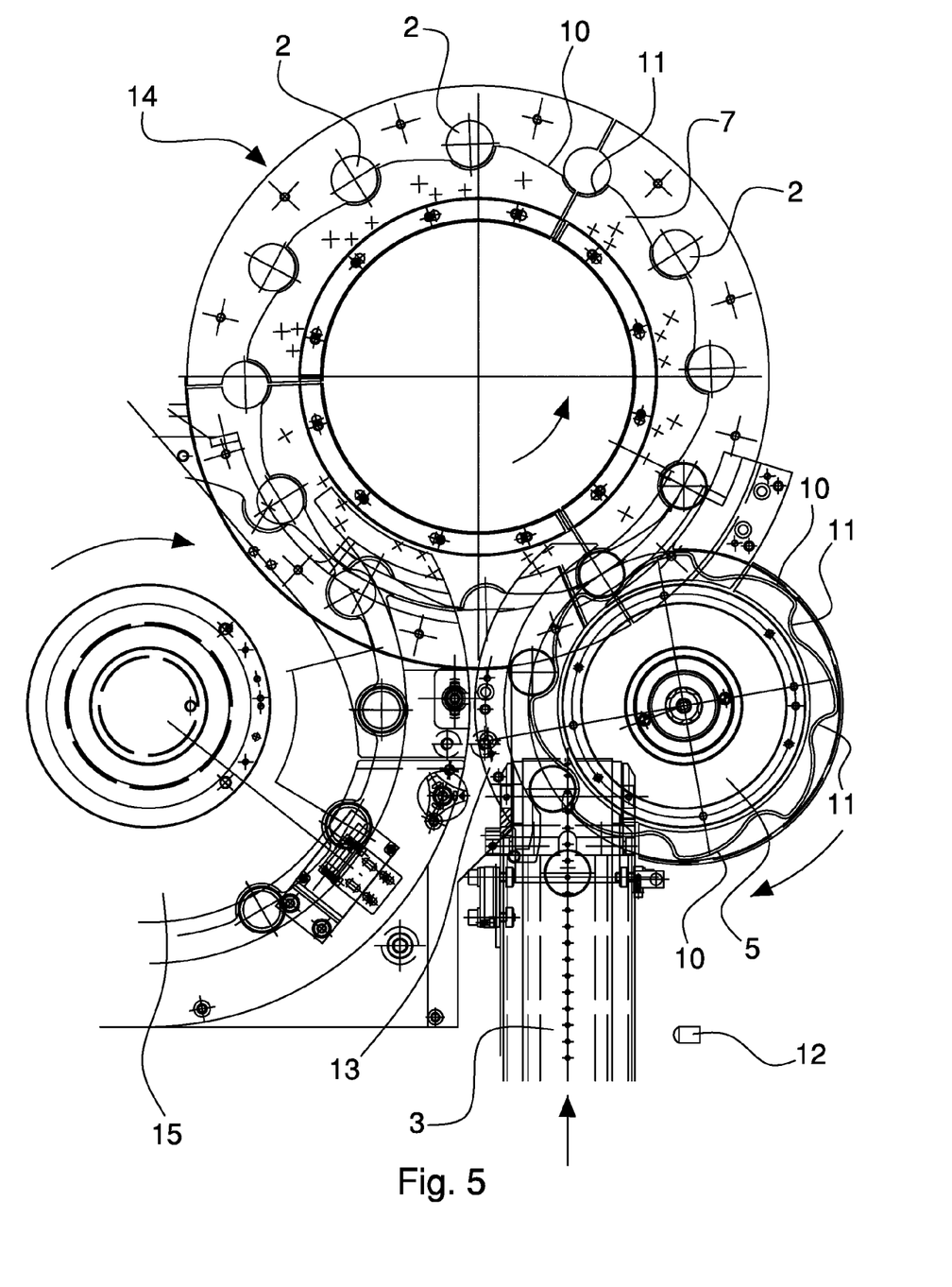
FIG. 5 is a top plane view of a second example.

In the example of FIG. 5, the guide for the objects on the first disc 5 includes a fixed side guide 13 and/or other fixed side guides 13 for the lateral containment of the objects dragged by the second disc 7 or the third disc 15.

Figure 6:
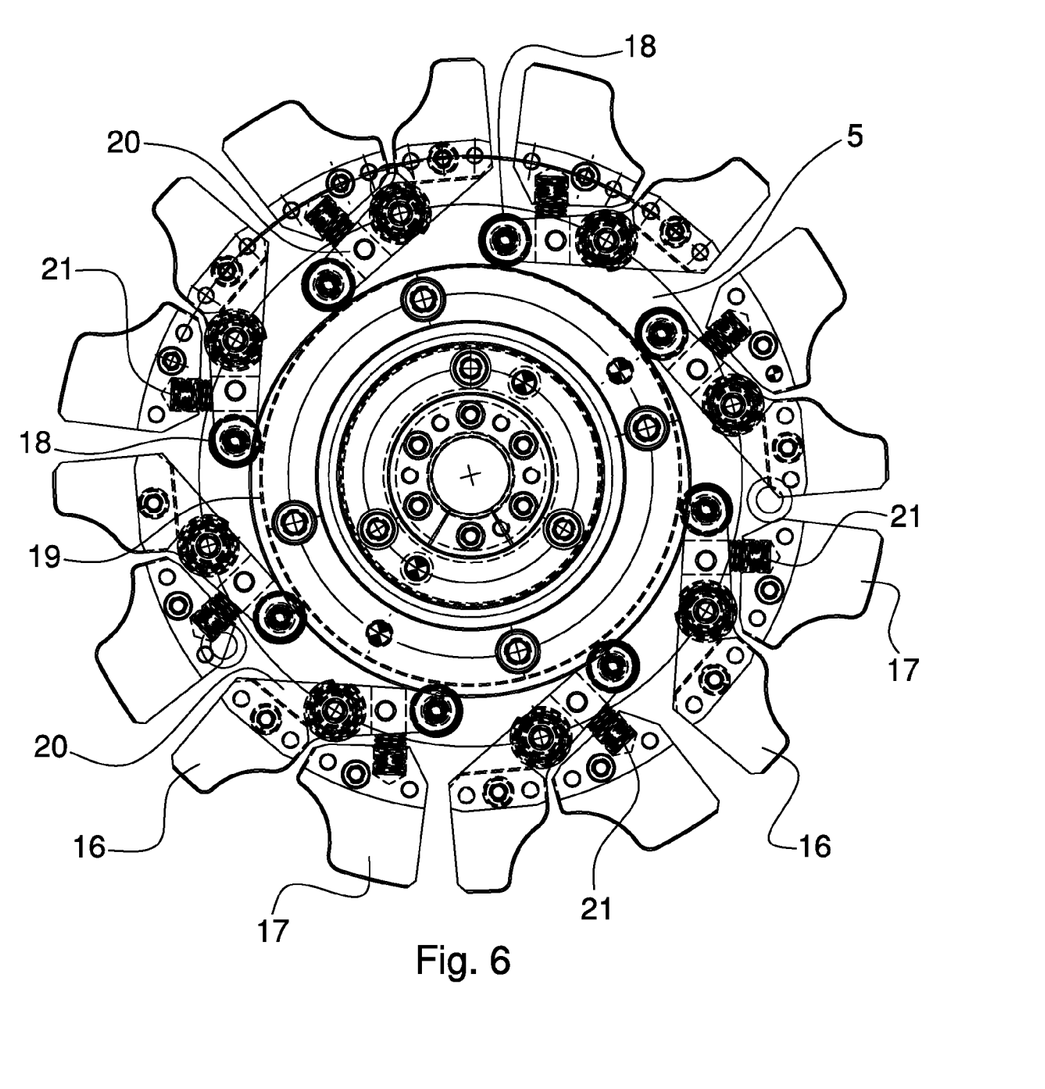
FIG. 6 is a top plane view of a rotating transport disc according to a third implementation example.
Figure 7:
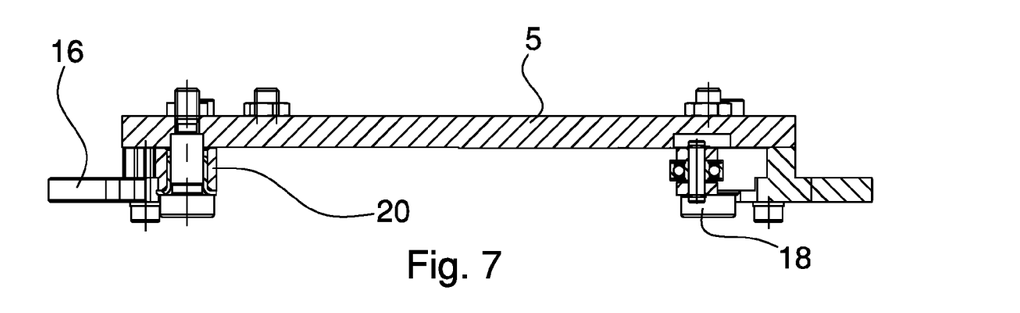
FIG. 7 is a section according to a vertical plane of the disc of FIG. 6.

With reference to the FIGS. 6 and 7, each of the first cavities of the first disc 5 suitable to receive the objects may comprise at least one first wall 16 movable with respect to a second wall 17 with the possibility to take an open position and a closed position. In the open position, the first cavity will have, on the whole, a width relatively greater than the closed position, in order to facilitate the input of an object 2 into the first cavity (and/or the output of an object from the first cavity). In the closed position, the first cavity will have a lesser width, so as to hold the object and drag it along the path on the disc 5 from the first area 4 to the second area 6.

The first wall 16 may be operatively associated to a drive mechanism arranged to make the first wall 16 selectively take the open position, for example at the first area 4 (and/or the second area 6), and the closed position, for example, at an intermediate path length ranging between the first area 4 and the second area 6.

Such a drive mechanism may include, as in the specific case, a plurality of cam follower members 18 and a stationary cam profile 19 coupled to the plurality of cam follower members 18. Each cam follower member 18 is associated to with a corresponding first wall 16, and the cam profile 19 is shaped in order to guide each cam follower member 18 so that each first wall 16 takes the desired open or closed position according to a preset trend as a function of the angular position of the first disc 5. Each cam follower member 18 may be carried by a corresponding rocker arm 20 that in turn may carry a corresponding first movable wall 16. In particular, each rocker arm 20 may be rotatably mounted about a rotation pin on the disc 5. It is possible to provide an elastic element 21 connected with each cam follower member 18 to hold the latter in contact with the profile 19.

Figure 8:
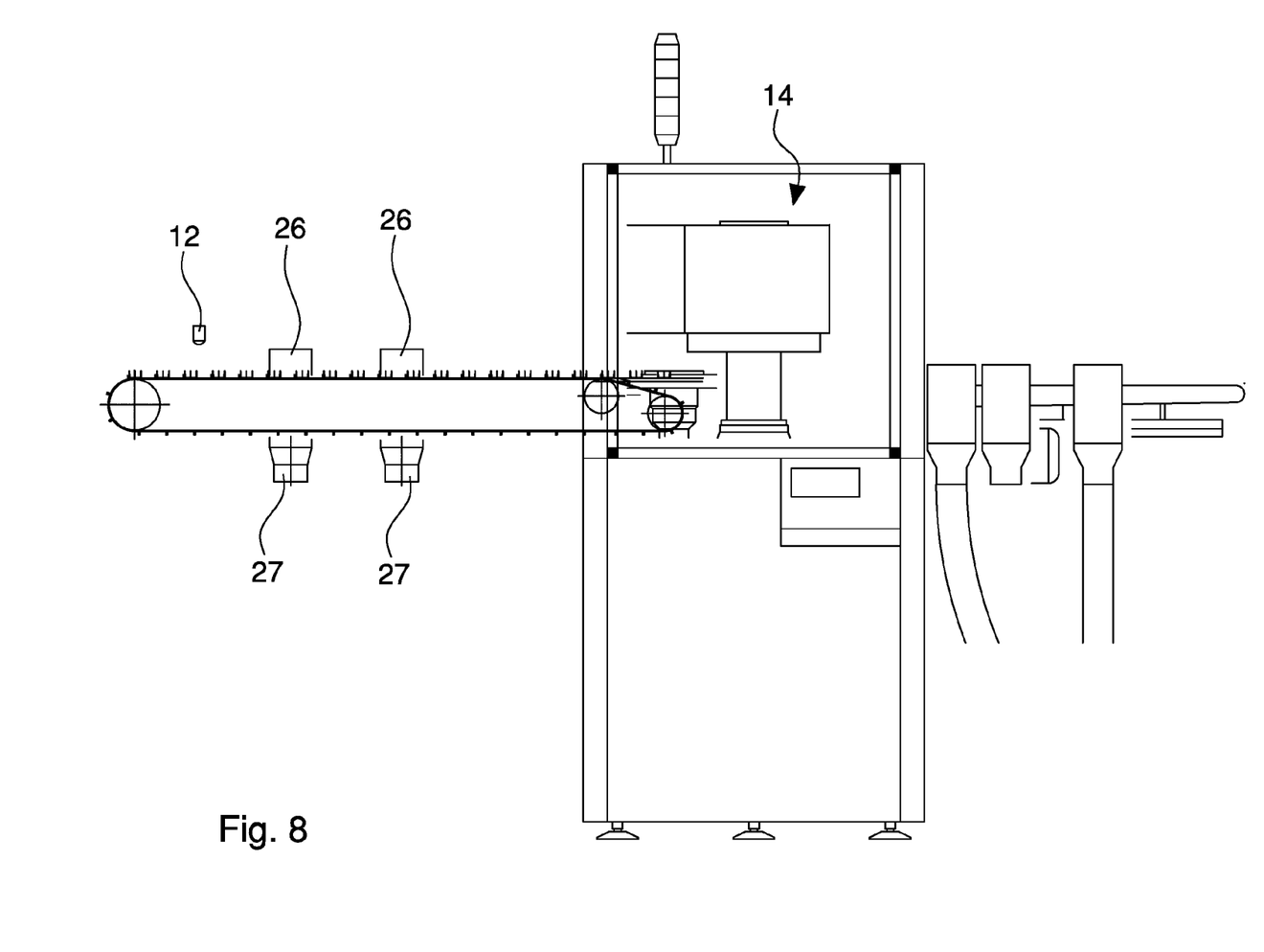
FIG. 8 is a vertical elevational view of a fourth example.
Figure 9:
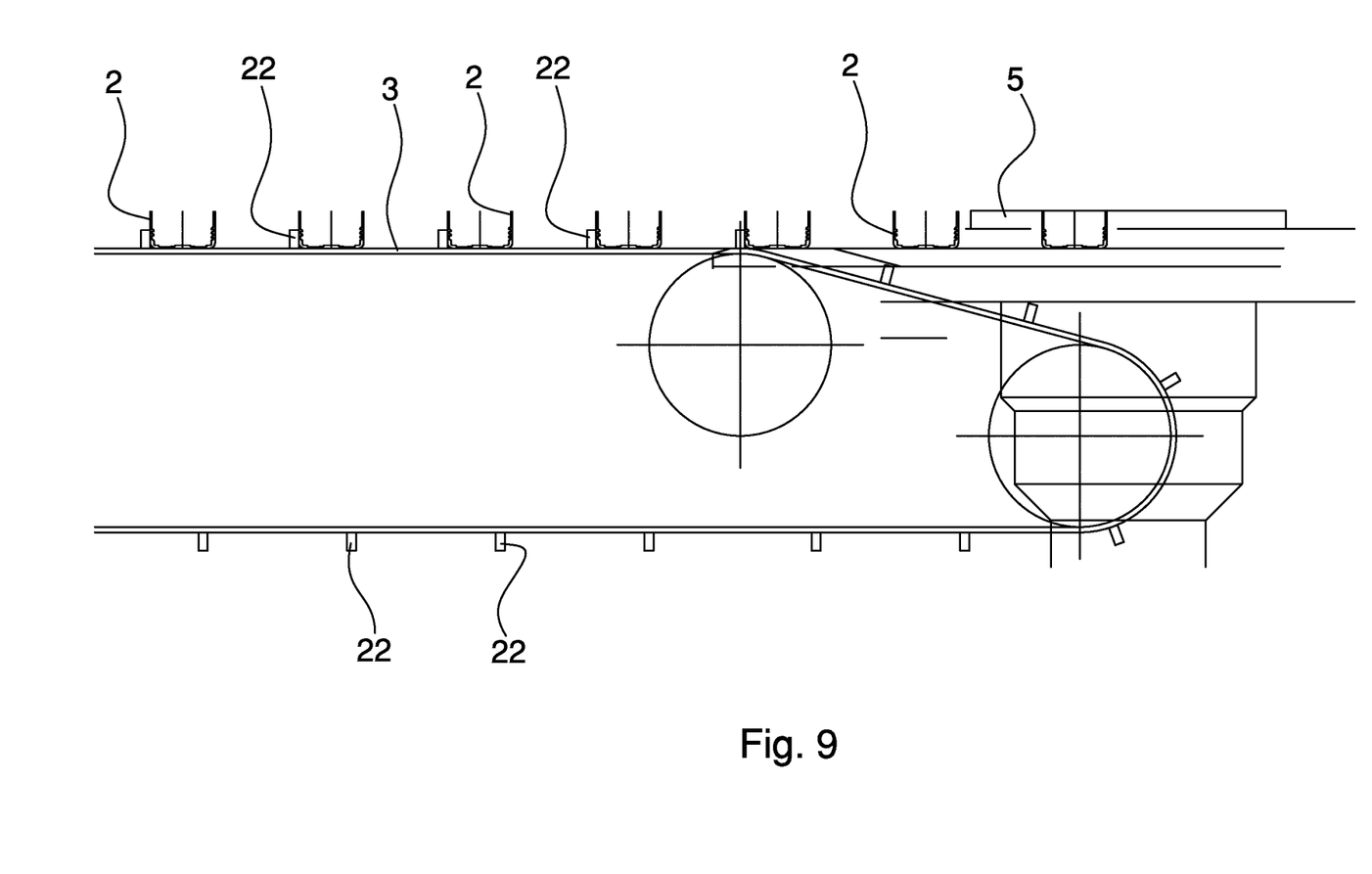
FIG. 9 is an enlargement of FIG. 8.

The conveyor belt 3 may comprise, as in the example of the FIGS. 8 and 9, a series of projections 22 (or dragging pegs) mutually spaced apart in the length of the belt 3 (at the same mutual distance that it is desired to have between the objects). Each projection 22 may be arranged to interact in contact with at least one object 2 conveyed by the belt 3, in particular to ensure that the distance between the objects 2 is maintained. The belt 3 may have an (upper) branch defining a horizontal transport plane. The projections 22 emerge (on the upper branch in the vertical direction) from the transport plane. In particular, each projection 22 on the upper branch of the conveyor belt 3 interacts in contact with the rear part of an object 2, thus maintaining the desired distance between the objects.

Figure 10:
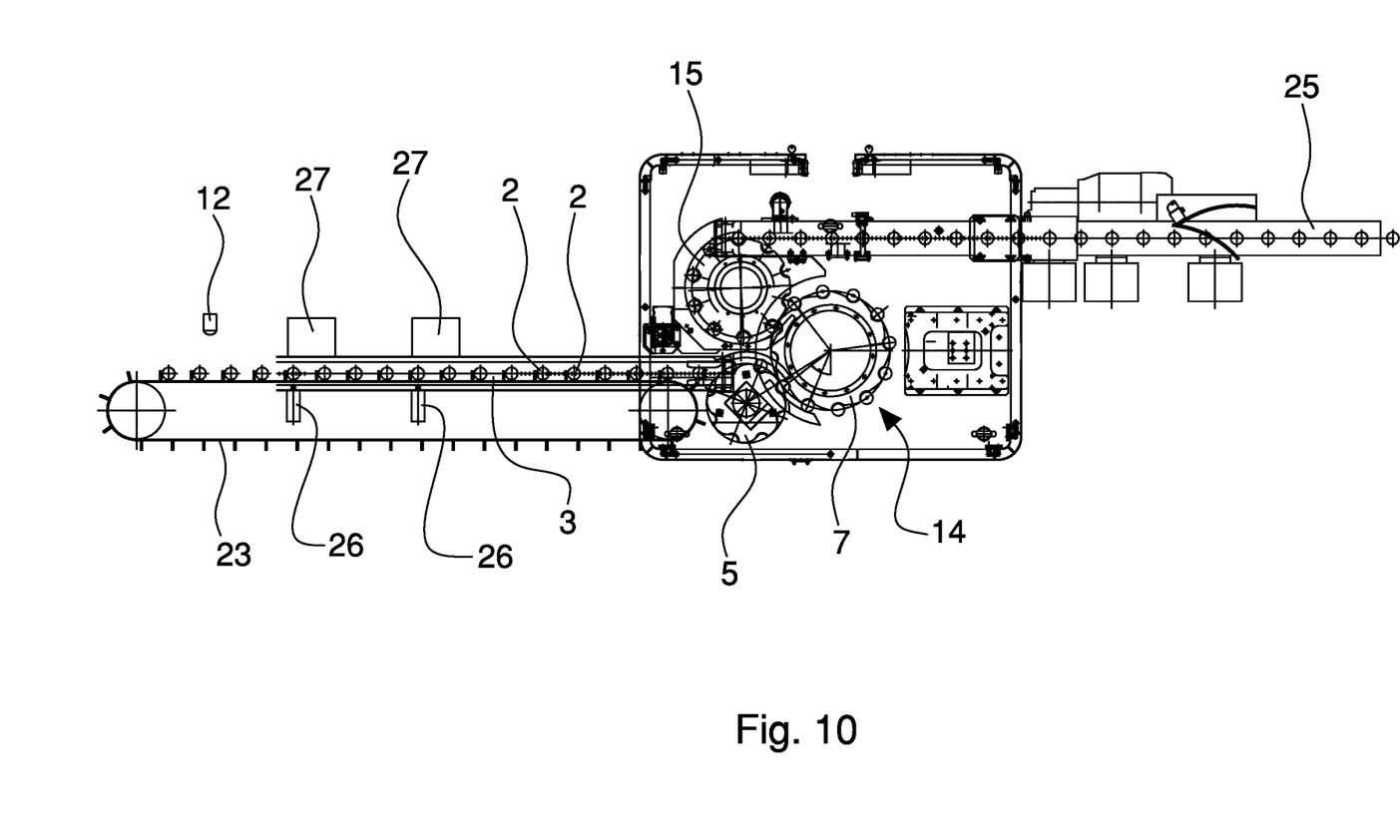
FIG. 10 is a top plane view of a fifth example.
Figure 11:
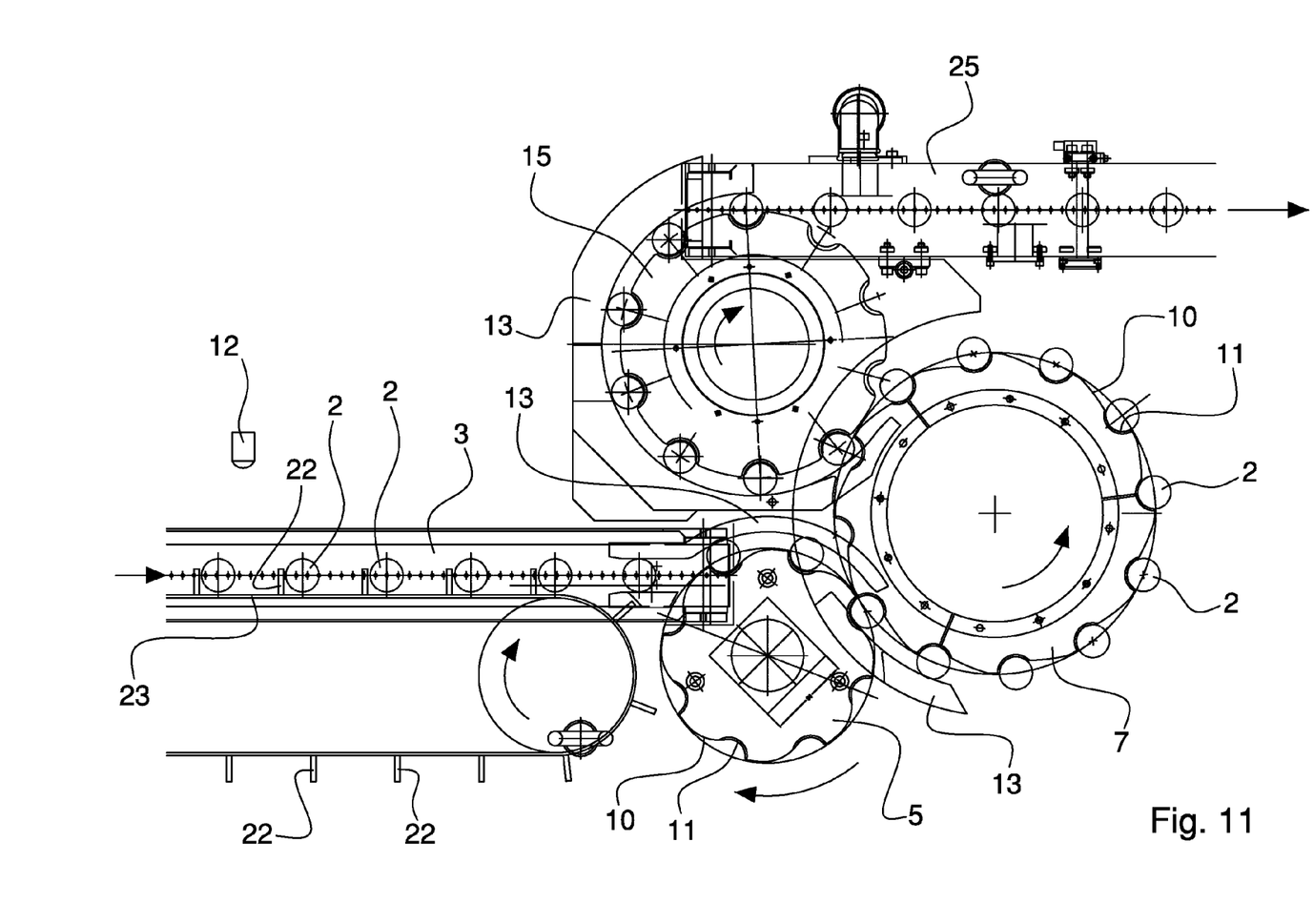
FIG. 11 is an enlargement of FIG. 10.

In the example of FIGS. 10 and 11, the belt 3, which is arranged with a horizontal upper planar part, is of the depression type including a suction device to hold the objects supported on the same belt. The belt 3 cooperates with a second belt 23 arranged with a vertical planar part adjacent to the belt 3. The second belt 23 carries the projections 22 that, on the length adjacent the horizontal upper branch of the belt 3, emerge from the second belt in the horizontal direction. Such projections 22 are arranged so as to be above the horizontal upper branch of the belt 3. In this example, each projection 22 may interact in contact with the rear part of an object 2 to position an object 2 on the belt 3 carrying out, if needed, a slight sliding of the object 2 on the belt 3 in order to maintain the desired distance between the same objects. The second belt 23 has a sliding speed that is slightly greater than the sliding speed of the belt 3.

Figure 12:
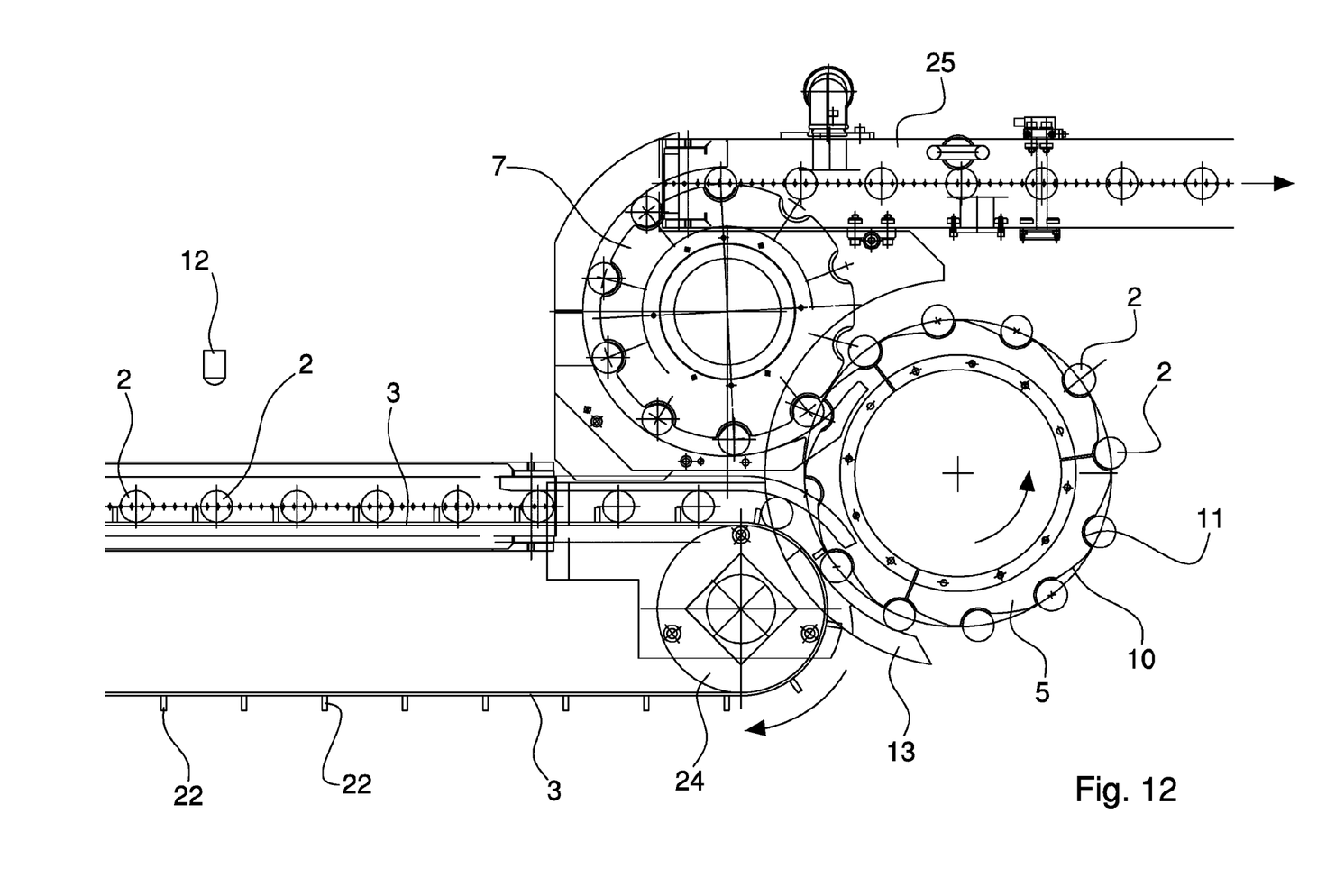
FIG. 12 is a top plane view of a sixth example.

It is possible to provide an example (FIG. 12) in which the belt 3 has a planar part oriented in the vertical direction and in which the projections 22 emerge from the belt 3 in the horizontal direction. The objects 2 are arranged on a horizontal transport plane (for example, fixed sliding plane, or a mobile transport plane, for example, by a suctioning belt) and they are dragged forward by the projections 22 coupled to the belt 3. The belt 3 may have in this case a curved path length (defined, for example by a pulley 24 on which the belt 3 is wrapped) arranged in the first area 4 in which the object is transferred by the belt 3 to the first disc 5. In this case, the first disc 5 may belong to the processing carousel in which the objects are processed.

The conveyor system may comprise, downstream of the first disc 5 and/or the second disc 7 and/or the third disc 15, a linear conveyor 25 (for example, in the form of a conveyor belt) on which the objects advance in a row (for example, according to a straight line) mutually spaced apart by a pitch.

The conveyor system may include a device for detecting an anomalous situation relative to the system, and a device 26 for ejecting objects from the conveyor belt 3 towards at least one deviation area 27 in response to an anomalous situation before such objects reach the first area 4. The device for detecting an anomalous situation may include, for example, a device for detecting an incorrect position of an object 2 on the conveyor belt 3, and/or a device for detecting a defective object 2 to be rejected, and/or a device for detecting a preset operative situation, such as an interruption, in an apparatus connected in line upstream or downstream with the conveyor belt 3. The device for detecting an anomalous situation may include, in particular, a photocell arranged to assess the proper position of the objects 2 on the belt 3.

In particular, the conveyor system 1 includes a sensor 12 for detecting a position error of the objects on the belt 3 on the basis of the signal emitted by the sensor 12 a device for comparing the detected position error to a preset threshold value and a device for rejecting the object based on the above-mentioned comparison, for example, if the position error exceeds the preset threshold value.

In use, the objects 2 (for example, closures for containers, in the specific examples illustrated, plastic capsules for bottles) are supplied through the belt 3. The objects 2 may advance supported on the belt, which may be an air-permeable depression belt which picks up the objects by suction, or a (closed loop) flexible conveying element of another type. The conveyor belt 3 may be arranged downstream of a machine to process the objects (for example, a forming machine for closures for containers). The distance between the objects 2 may be preset as a function of the operations carried out in the machine arranged upstream, with possible positioning errors that will result in possible variation in the above-mentioned distance. The conveyor belt may be arranged upstream of a further machine to process the objects (for example, a machine for cutting the closures). The distance between the objects arranged on the conveyor belt could be different from the distance required by the further machine arranged downstream. In fact, such further machine could, for example, comprise a transport disc (or another rotating transport member) suitable to operate with a distance between the objects (pitch) that is different from the mutual distance (sometimes irregular, and not always constant) of the objects arranged on the belt 3. In other terms, the (linear) distance between two objects on the belt 3 may be different from the distance (angular or circumferential) between two objects received on the first cavities of the first rotating transport disc 5, which picks up the objects coming out from the belt. The control unit managing the operation of the further machine arranged downstream may control, for example, the speed of the first disc 5 (keeping the speed of the belt 3 constant) so as to ensure the coordination between the advancing movement of the objects on the belt 3 and the grip of the objects 2 by the first transport disc 5.

Therefore, it will be possible to adapt, in a simple an rapid manner, the feeding speed of the objects 2 to the needs (that are variable, in a controlled manner and/or in a non-controlled manner) of the transport line on the whole, in particular, by adjusting the speed of the conveyor belt 3 in a manner that is independent from the adjustment of the speed of the first disc 5 (in particular, by keeping one speed of the speed of the belt 3 and the speed of the first disc 5 constant, and varying the other one).

The invention claimed is:

1. A conveyor system, comprising
   (a) a movable conveyor belt having a controlled speed to convey objects to a first area, said belt advancing the objects in a row one after another at a distance from each other;
   (b) a first rotating disc having a controlled speed rotating about a first rotational axis to pick up the objects from said first area and to convey the objects to a second area, said first disc containing a plurality evenly angularly spaced of first cavities on the perimeter thereof, said cavities being recessed in the radial direction to receive the objects;
   (c) a motor independently driving said conveyor belt and said first rotating disc with controlled speeds;
   (d) a sensor emitting a signal relative to the position of an object on said conveyor belt;
   (e) a control unit for controlling the speed of at least one of said conveyor belt and said first rotating disc in response to said signal so that the object reaches said first area simultaneously with the arrival of a corresponding first cavity of said first disc; and
   (f) a second rotating disc having a controlled speed about a second rotational axis to pick up the objects from said second area and to convey them to a third area.

2. The system according to claim 1, wherein said control unit comprises a device for detecting a position error of an object on said conveyor belt based on said signal, a device for comparing said position error to a preset reference value, and a device for rejecting the object based on said comparison before the object reaches said first area.

3. The system according to claim 1, wherein said control unit further comprises a device for changing the speed of said belt in response to said signal.

4. The system according to claim 1, wherein each first cavity is configured with a first end portion with a first inclination to enable the object to enter the first cavity and a second end portion with a second inclination to house the object in the first cavity during transport.

5. The system according to claim 4, wherein said first inclination has a ratio between a tangential component and a radial component that is greater than a ratio between a tangential component and a radial component of said second inclination, said tangential and radial components being with reference to a circumference about said first rotational axis.

6. The system according to claim 1, wherein said second rotating disc belongs to a carousel for machining closures for containers.

7. The system according to claim 6, wherein said carousel cuts a weakening area on the closures.

8. The system according to claim 1, wherein said second disc contains a plurality of evenly angularly spaced second cavities on the perimeter thereof, said second cavities being recessed in radial direction to receive the objects.

9. The system according to claim 8, wherein the total number of second cavities of said second disc is greater than the total number of first cavities of said first disc.

10. The system according to claim 1, and further comprising a first guide arranged to oppose a centrifugal force applied on the objects in at least one part of the path travelled by the objects conveyed from said first rotating disc.

11. The system according to claim 10, wherein said first guide comprises at least one fixed side guide arranged for lateral containment of the objects conveyed by said first rotating disc.

12. The system according to claim 10, wherein said first guide further comprises a suction device for said first cavities to hold the object in place by a depression.

13. The system according to claim 12, wherein said suction device comprises an actuator to generate a depression, a suction manifold opening, and a plurality of suction ducts.

14. The system according to claim 13, wherein said actuator is arranged externally to said first disc, said suction manifold opening being arranged externally to said first disc and being connected to said actuator, said suction ducts being arranged internally of said first disc and being connected to said suction manifold opening.

15. The system according to claim 13, wherein each suction duct has a first end opening in a corresponding first cavity and a second end opening on a surface of said first disc facing said suction manifold opening.

16. The system according to claim 15, wherein each first cavity is shaped to have a first end portion with a first inclination to enable the object to enter the first cavity and a second end portion with a second inclination to house the object in the first cavity during transport, and wherein for each suction duct, said first end of the suction duct opens in said first end portion of the corresponding first cavity.

17. The system according to claim 15, wherein said second ends are arranged so as to follow a preset path during the rotation of said first disc, said suction manifold opening being arranged facing a portion of said path so that, while said first disc rotates, each suction duct cyclically alternates between an object holding active period in which each duct is connected to said actuator when said second end faces said suction manifold opening, and an inactive period in which each duct is not connected to said actuator when said second end does not face said suction manifold opening.

18. The system according to claim 6, wherein said carousel folds a safety band of the closures.

19. The system according to claim 6, wherein said carousel borders the closures.

20. The system according to claim 6, wherein said carousel molds gaskets within the closures.

21. A conveyor system comprising:
(a) a movable conveyor belt having a controlled speed to convey objects to a first area, said belt advancing the objects arranged in a row one after another at a distance from each other;
(b) a first rotating disc having a controlled speed rotating about a first rotational axis to pick up the objects from said first area and to convey the objects to a second area, said first disc containing a plurality evenly angularly spaced of first cavities on the perimeter thereof, said cavities being recessed in the radial direction to receive the objects;
(c) a motor independently driving said conveyor belt and said first rotating disc with controlled speeds;
(d) a sensor emitting a signal relative to the position of an object on said conveyor belt; and
(e) a control unit for controlling the speed of at least one of said conveyor belt and said first rotating disc in response to said signal so that the object reaches said first area simultaneously with the arrival of a corresponding first cavity of said first disc, said control unit comprising a device for detecting a position error of an object on said conveyor belt based on said signal, a device for comparing said position error to a preset reference value, and a device for rejecting the object based on said comparison before the object reaches said first area.

22. A conveyor system comprising:
(a) a movable conveyor belt having a controlled speed to convey objects to a first area, said belt advancing the objects arranged in a row one after another at a distance from each other,
(b) a first rotating disc having a controlled speed rotating about a first rotational axis to pick up the objects from said first area and to convey the objects to a second area, said first disc containing a plurality evenly angularly spaced of first cavities on the perimeter thereof, said cavities being recessed in the radial direction to receive the objects, each first cavity being configured with a first end portion with a first inclination to enable the object to enter the first cavity and a second end portion with a second inclination to house the object in the first cavity during transport;
(c) a motor independently driving said conveyor belt and said first rotating disc with controlled speeds;
(d) a sensor emitting a signal relative to the position of an object on said conveyor belt; and
(e) a control unit for controlling the speed of at least one of said conveyor belt and said first rotating disc in response to said signal so that the object reaches said first area simultaneously with the arrival of a corresponding first cavity of said first disc.

23. A conveyor system comprising:
(a) a movable conveyor belt having a controlled speed to convey objects to a first area, said belt advancing the objects arranged in a row one after another at a distance from each other;
(b) a first rotating disc having a controlled speed rotating about a first rotational axis to pick up the objects from said first area and to convey the objects to a second area, said first disc containing a plurality evenly angularly spaced of first cavities on the perimeter thereof said cavities being recessed in the radial direction to receive the objects;
(c) a motor independently driving said conveyor belt and said first rotating disc with controlled speeds;
(d) a sensor emitting a signal relative to the position of an object on said conveyor belt;
(e) a control unit for controlling the speed of at least one of said conveyor belt and said first rotating disc in response to said signal so that the object reaches said first area simultaneously with the arrival of a corresponding first cavity of said first disc; and
(f) a first guide arranged to oppose a centrifugal force applied on the objects in at least one part of the path travelled by the objects conveyed from said first rotating disc, said first guide further comprising a suction device for said first cavities to hold the object in place by a depression.

* * * * *